United States Patent [19]

Bennett et al.

[11] 4,048,460

[45] Sept. 13, 1977

[54] METHOD OF WELDING A COVER TO A CONTAINER

[75] Inventors: Moreland P. Bennett, Hickory; Albert M. Hobbs, Jr., Conover, both of N.C.

[73] Assignee: General Electric Company, Philadelphia, Pa.

[21] Appl. No.: 637,950

[22] Filed: Dec. 5, 1975

Related U.S. Application Data

[62] Division of Ser. No. 572,455, April 28, 1975, Pat. No. 3,962,662.

[51] Int. Cl.[2] .............................................. B23K 11/10

[52] U.S. Cl. ....................................... 219/91; 219/105; 219/137 R; 220/378

[58] Field of Search ..................... 220/378; 219/91, 93, 219/105, 137 R

[56] References Cited

U.S. PATENT DOCUMENTS

| | | | |
|---|---|---|---|
| 2,590,803 | 3/1952 | Ungor | 220/378 X |

*Primary Examiner*—E. A. Goldberg
*Attorney, Agent, or Firm*—Francis X. Doyle; William Freedman

[57] ABSTRACT

A metal welding gasket secured between a cover and a container to prevent expulsion of weld material into the interior of the device being welded.

3 Claims, 8 Drawing Figures

METHOD OF WELDING A COVER TO A CONTAINER

This is a division of application Ser. No. 572,455, filed Apr. 28, 1975 now U.S. Pat. No. 3,962,662 issued June 8, 1976.

BACKGROUND OF THE INVENTION

This invention relates to welding covers to containers for electrical devices and more particularly, to a metal welding gasket used between the cover and the container of an electrical apparatus to prevent expulsion of the weld material into the container.

In electrical apparatus such as for example, distribution transformers the coil and core members are usually enclosed in a fluid-filled container. The fluid acts as part of the insulation system and it is desirable to seal the container to prevent contamination of the fluid. In the manufacture of such electrical apparatus the various bushings and the like are fixed to the container, the core and coil unit mounted therein, the necessary connections made between the core and coil unit and the bushings, the fluid introduced into the container and finally, the cover secured to the container. Often, to provide a sealed unit, the cover is welded in place to the top of the container.

In welding the cover a problem arises in that some of the welding material may be expelled during the welding into the container. As can be well understood, this can contaminate the insulating fluid, could cause a shorting in the core and coil unit, thus leading to the failure of the transformer or other electrical apparatus. Presently, to prevent this expulsion, gaskets of asbestos and glass tape are used, usually cemented to the cover or to the container. The use of asbestos and glass tape presents problems in properly aligning it around the cover or the container. Further, while the cement is hardening, care must be used in handling the cover or the container to prevent displacement of the gasket. Also, often the cement or part of the tape intrudes into the weld area, leading to poor quality welds.

It has recently been discovered that these problems can be eliminated by the use of a metal gasket which may be spot welded in position on either the cover or the container.

It is therefore, one object of this invention to provide a metal welding gasket for electrical apparatus.

It is a further object of this invention to provide a metal gasket which may be spot welded to either the cover or the container of an electrical apparatus.

SUMMARY OF THE INVENTION

Briefly, in a preferred form of this invention, a thin metal member, preferably bent on its longitudinal axis, is spot welded to the cover or container of electrical apparatus. The cover is then placed on the container and welded thereto. The thin metal member acts as a gasket preventing weld expulsion from entering the container.

The invention which is sought to be protected will be particularly pointed out and distinctly claimed in the claims appended hereto. However, it is believed that this invention and the manner in which its various objects and advantages are obtained as well as other objects thereof will be better understood by reference to the following detailed description of a preferred embodiment, particularly when considered in the light of the accompanying drawings.

DESCRIPTION OF PREFERRED EMBODIMENT

This invention relates to a metal welding gasket to prevent weld expulsion from entering the container of an electrical apparatus. The invention will be described as to a preferred embodiment by reference to the drawings, in which like numerals are used to indicate like parts throughout the various views. While the invention will be described by reference to a particular electrical apparatus it will be understood that it is not limited thereto.

Figure 1:
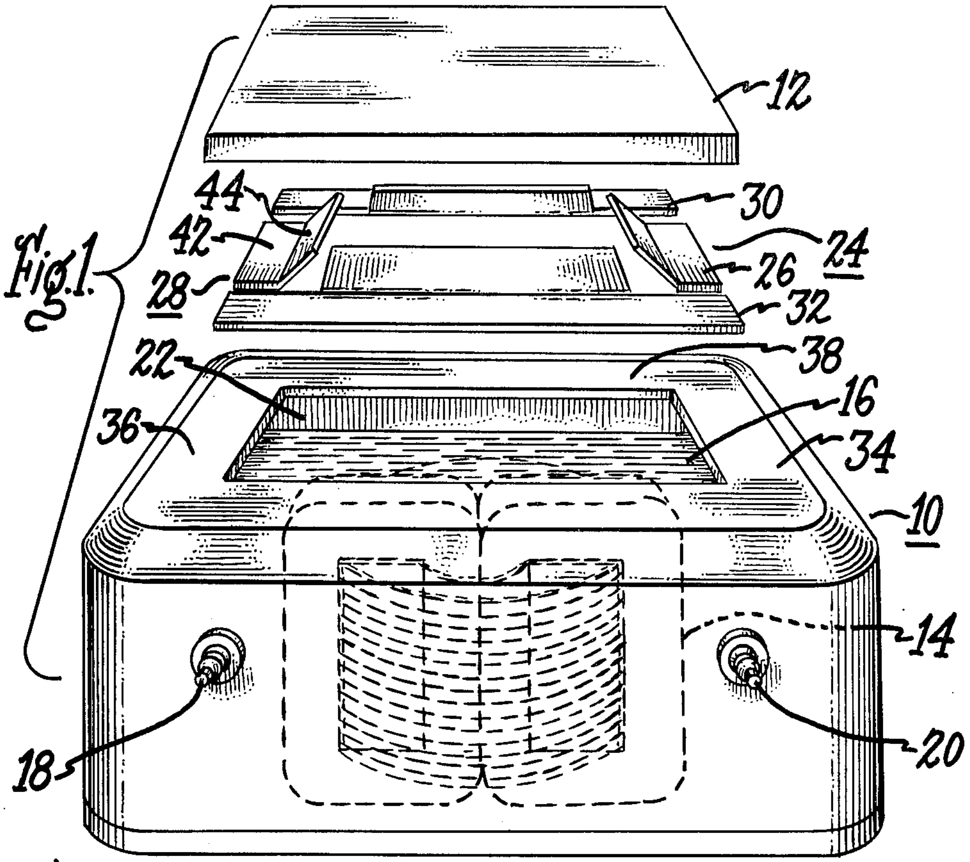
FIG. 1 is a perspective, exploded view of a preferred embodiment of this invention and the manner of its application.

Referring now to FIG. 1 there is shown an electrical apparatus such as for example, a distribution transformer, having a container, tank or housing 10 and a cover 12. Container 10 includes a core and coil unit 14 mounted therein in any well known manner and covered with a dielectric fluid, such as mineral oil 16. A high voltage bushing 18 and a low voltage bushing 20 are provided in the usual manner for energizing the core and coil 14 and providing electrical energy to a load, such as a residence or the like (not shown).

Since it is desired to seal the container 10, a cover member 12 is provided, normally welded to the container 10, enclosing and sealing the opening 22. During welding of cover 12 to container 10 it is possible that weld expulsion from the welding operation will enter container 10 contaminating the fluid, such as oil 16 and possibly injuring the core and coil unit 14. To prevent such expulsion, the weld gasket 24 of this invention is provided.

Figure 2:
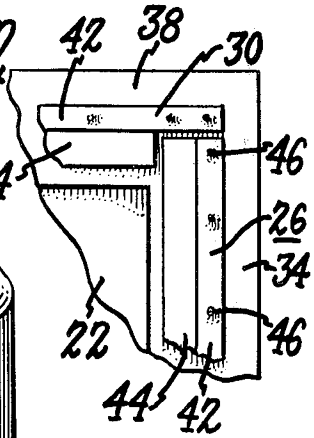
FIG. 2 is a partial plan view showing the application of a gasket of this invention to a container.

In the embodiment shown in FIG. 1, the gasket 24 comprises four members 26, 28, and 30, 32. As can be seen, members 26, 28 are substantially identical as are members 30, 32. As will be understood, members 26, 28 may be spot welded to top wall portions 34, 36 on opposite sides of opening 22. In a similar manner, gasket members 30 and 32 may be spot welded to top wall portions 38 and 40 also on opposite sides of openings 22. FIG. 2 of the drawing shows a partial view of the tank 10, showing the members 26 and 30 welded to the top wall portions 34, 38.

As will be apparent from FIGS. 1 and 2, each of the gasket members 26, 28, 30 and 32 are provided with a flat base portion 42 and a bent or angle portion 44 bent along the longitudinal axis of the gasket member. In referring to FIG. 2, it will be seen that with reference to member 30, the flat base portion 42 is larger than the bent portion 44 and extends substantially to the edge of the flat portion 42 of gasket 26. This provides the gasket completely around opening 22 to prevent weld expulsion in any area. As shown in FIG. 2, the flat portions 42 are preferably spot welded to the top portions of container 10 by spot welds, indicated by spot welds 46.

As will be understood, due to manufacturing tolerances and the like, the top surface, formed by top wall portions 34, 36, 38 and 40 are not level, and often cover member 12 is twisted or warped. As a consequence, the cover 12 does not fit tightly against the top of container 10. The bent portion 44 of gasket members 26, 28, 30 and 32 will engage the underside of cover 10 providing a tight gasket type seal thus, preventing weld expulsion from entering the container 10.

Figure 3:
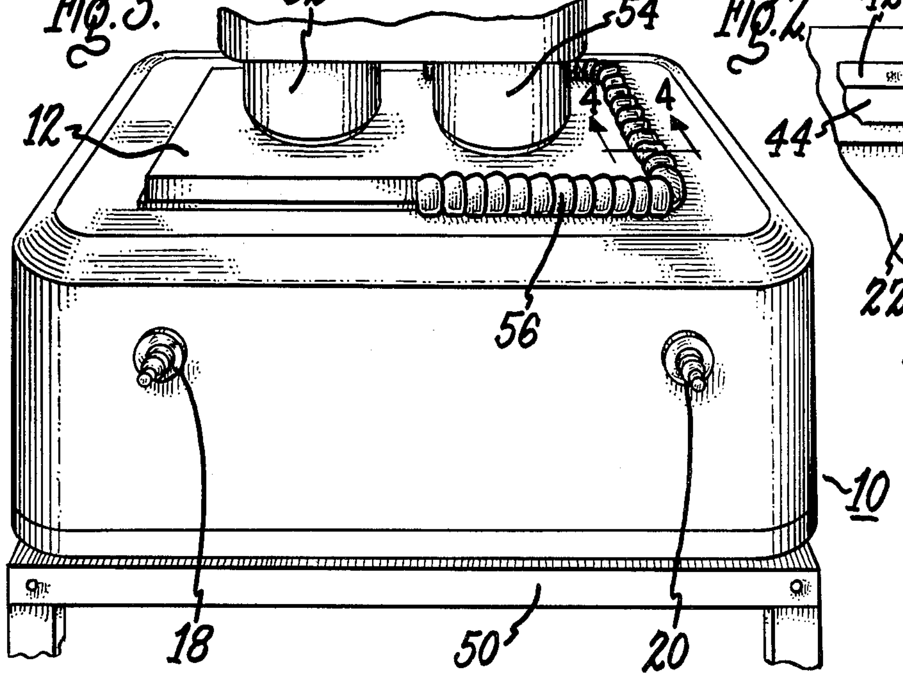
FIG. 3 is a perspective view showing the parts of FIG. 1 assembled and being welded.
Figure 4:
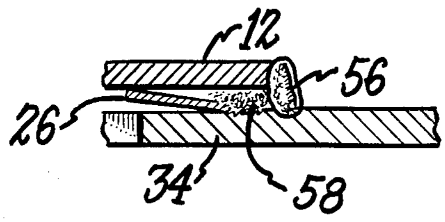
FIG. 4 is a sectional view taken on the line 4-4 of FIG. 3.

FIG. 3 shows one method of welding cover 12 to tank or container 10. As is shown, container 10 is placed on table 50 and cover 12 is placed over opening 22 in contact with the gasket 24 (not shown in FIG. 3). A clamping means, such as cylinders 52 and 54 are pressed against cover 12, firmly holding it in position against container 10. Then using a welding process, for example gas metal arc welding (not shown), the cover is welded to the container as is indicated at 56. FIG. 4 shows the gasket member 26 in place between cover 12 and top wall portion 34 of the container 10. A portion of weld bead 56 is shown, welding the cover 12 to the top wall portion 34. As can be seen, the weld expulsion 58 is prevented from entering the container 10 by the gasket 26.

Figure 5:
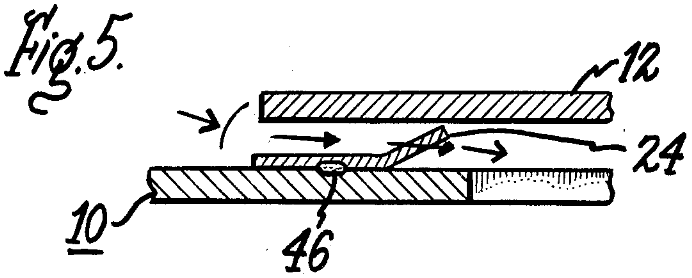
FIGS. 5 and 6 show alternate forms of the preferred embodiment of the metal welding gasket of this invention.
Figure 6:
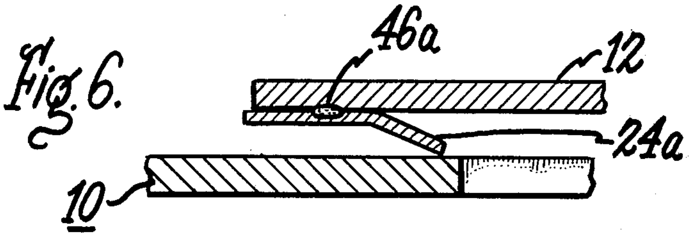

FIGS. 5 and 6 disclose alternate forms of the preferred embodiment. FIG. 5 shows the gasket 24 spot welded to container 10 as is indicated at 46. In FIG. 6 the gasket **24*a* is shown spot welded to cover 12, as indicated at 46*a*. In one example of this invention, the gasket 24 was formed of mild steel 0.010 inches thick and 1 inch wide. The container 10 and the cover 12 were formed of mild steel 0.105 inches thick. The gasket 24 was spot welded approximately 3 inches apart along the length of the flat base member 42 as is indicated for example, at 46 in FIG. 2**.

ALTERNATE EMBODIMENTS

Figure 7:
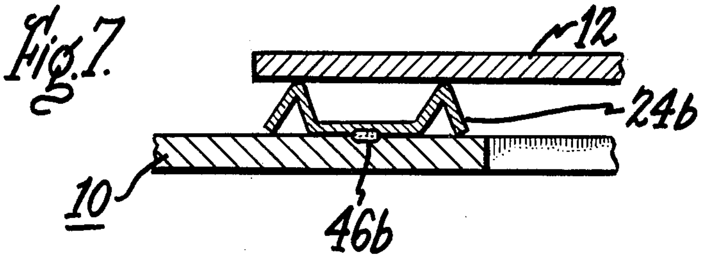
FIGS. 7 and 8 show other possible configurations of the metal gasket of this invention.
Figure 8:
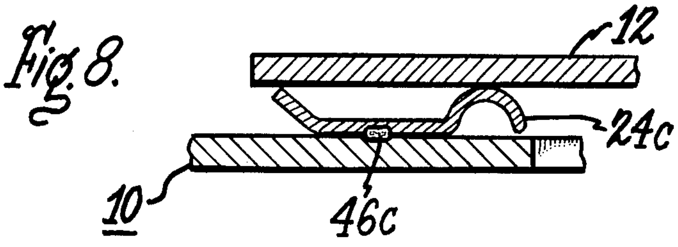

FIGS. 7 and 8 show alternate embodiments which may be utilized for the metal welding gasket or shield of this invention. FIG. 7 shows a weld gasket **24*b* which is formed with angles at opposite ends and the center portion is welded to the tank as indicated at 46*b*. As will be understood, the two angular members at opposite ends of the weld gasket will provide better sealing against the cover 12 and will make up for any manufacturing tolerances in the forming of the gasket 24*b*. In the same manner, gasket 24*c* of FIG. 8 is provided with an angle at one edge and a semicircular member at the other edge. Again, the flat portion is spot welded as shown at 46*c* to the container 10. As will be understood, again the use of two different bent or curved members as shown in FIG. 8 will provide tighter sealing between the cover 12 and the container 10 providing better sealing in case of problems with manufacturing tolerances. Of course it will be understood, from reference to FIG. 6, that the gaskets 24*b* and 24*c* could equally be welded to cover 12** while providing the identical function.

While there has been shown and described the present preferred embodiment of this invention, it will be clear to those skilled in the art that various changes may be made. As has been noted, the gasket may be welded either to the cover or to the container as is desired and still provide the desired gasket from the weld expulsion. Obviously as indicated from FIGS. 6, 7 and 8, various configurations of the gasket member may be provided. The desirable feature is to utilize at least one flexible portion of the gasket such that, when the cover is placed on the container the flexible member will provide an adequate gasket seal despite manufacturing tolerances or warpage or twisting of the cover or container. Of course, it will be understood that the weld gasket may be placed on the container and the cover placed thereover, holding the gasket in place, without spot welding. Also, it will be apparent that the gasket could be of a single piece rather than the plurality of pieces shown. One advantage that will occur to those skilled in the art is that the weld gasket may be made of a metal that will enhance the quality of the weld. It is invended by the claims appended hereto to cover all such modifications as fall within the spirit and scope of the invention.

What is claimed as new and which it is desired to secure by Letters Patent of the U.S. is:

1. A method of welding a cover to a container using a metal gasket comprising the steps of a. providing a metal gasket from a thin strip of metal,
   1. said gasket being bent along its longitudinal axis forming a flat portion and a bent portion, b. placing said metal gasket on the edge of the container, c. placing said cover on said container in contact with said gasket, d. clamping said cover onto said container, e. and welding the edges of said cover to said container.

2. The method set forth in claim 1 in which said flat portion is spot welded to said cover.

3. The method set forth in claim 1 in which said flat portion is spot welded to said container.

* * * * *